July 5, 1966   F. L. BOUQUET, JR., ET AL   3,258,911
RADIONUCLIDE PROPULSION DEVICE Filed June 24, 1963   3 Sheets-Sheet 2

INVENTORS
FRANCIS L. BOUQUET JR.
SAMUEL J. SMYTH

By George C. Sullivan
Agent

July 5, 1966 F. L. BOUQUET, JR., ET AL 3,258,911
RADIONUCLIDE PROPULSION DEVICE
Filed June 24, 1963 3 Sheets-Sheet 3

INVENTORS
FRANCIS L. BOUQUET JR.
SAMUEL J. SMYTH
By George C. Sullivan
Agent

United States Patent Office 3,258,911
Patented July 5, 1966

3,258,911
RADIONUCLIDE PROPULSION DEVICE
Francis L. Bouquet, Jr., San Fernando, and Samuel J. Smyth, La Canada, Calif., assignors to Lockheed Aircraft Corporation, Burbank, Calif.
Filed June 24, 1963, Ser. No. 291,598
8 Claims. (Cl. 60—35.6)

The present application is a continuation-in-part of application Serial No. 50, 203, filed August 17, 1960, now abandoned.

The present invention relates to a propulsion device. More particularly, it relates to a nuclear propulsion device especially adapted for use in vehicles. Even more particularly, it pertains to a nuclear propulsion device which utilizes a power source other than the usual reactor process.

A great deal of effort has gone toward finding some means to utilize nuclear power as a fuel source for propulsion devices because of the long range characteristics available. Nuclear fuel provides a motive force for a period of many days, weeks, or even months. Conventional vehicular fuels will last for only a few hours because of storage limitations within the vehicle. A very small amount of nuclear fuel will theoretically carry a vehicle around the world several times.

Generally speaking, propulsion devices which utilize nuclear fuels have, to date, involved a nuclear reactor which generates an extremely high heat which is utilized to drive the propulsion device. The usual reactor not only generates heat, but much radioactivity. Radioactivity is dangerous to humans and to the structural parts of the vehicle for which it supplies the source of power. Because of this, heavy shielding comprised of lead or a similar metal must encase the reactor. In many instances, the size and weight of the reactor and its shielding often outweigh the advantages of the small volume of fuel necessary for propulsion.

Nuclear fuels, radionuclides, have been discovered which develop high thermal heat but which have relatively low gamma activity. Therefore, utilization of such fuels result in a significant reduction in the thickness of shielding required to surround the power source while still producing the tremendous heat necessary to drive the propulsion device. These new nuclear fuels are produced by bombarding specialized materials with neutrons, thereby causing them to become radioactive and producing thermal heat. In addition to their high cost a basic problem in the practical application of such fuels has been the lack of an efficient means to control the emission of heat from the fuel. Once the neutron bombardment has produced the radionuclide, that fuel produces heat continuously throughout the remainder of its life.

Through the judicious selection of a radionuclide for use as a fuel, its inherent problems may be minimized. The radionuclides which are presently most acceptable are polonium 210 and curium 212. Of these, polonium 210 is preferred. These radionuclides, while having the capability of producing heat in amounts sufficient to fulfill the needs of the present system, are, nevertheless, limited in their heat production such that an inherent safety factor is present.

The characteristics of polonium 210 which make it particularly acceptable for the present system are described in a book entitled "Polonium," edited by Harvey V. Moyer and published by the United States Atomic Energy Commission Technical Information Service Extension in July 1956. This book is incorporated herein by reference in its entirety. Polonium 210, which is presently available at relatively moderate cost and which can be produced in large quantities at extremely low cost, has a gamma activity which is extremely weak as compared with other radionuclides. This beneficial characteristic which reduces shielding requirements to a minimum is, nevertheless, accompanied by the ability to produce large quantities of heat. For example, in 1957 the inventor calculated the heat production at 1320 thermal power watts per cubic centimeter or 141 watts per gram of material. These calculations were later published in an article entitled "Radionuclide Power and Space Missions" by Douglas G. Harvey and Jerome G. Morse which appeared in "Nucleonics" magazine, volume 19, No. 4, April 1961, page 69. This article is also incorporated herein by reference. This heat release results in the ability to operate a typical large system described herein through the utilization of approximately six pounds of polonium 210. In practice this fuel is diluted with a high heat transfer coefficient metal, e.g., copper, silver or tungsten. The U.S. Atomic Energy Commission has also produced encapsulated polonium fuel elements which provide constant heat as high as 800° C. or 1460° F., and much larger units producing greatly increased heats are presently under development. Since the half-life of polonium is 138.4 days, it is capable of use as a fuel for extended time periods.

Although curium 242, a fission product, has a somewhat higher gamma activity than does polonium 210, its heat production is comparable (1169 thermal power watts per cc.) and, properly shielded, it provides an acceptable fuel for the present system. It has a half-life of 162 days.

The half-life of various radionuclides extend for periods of 50 days to 35 years. It is obvious that a vehicle using such fuels will not be required to continue in motion, nor will it be desired that it continue in motion for that period of time.

It is an object of this invention to provide a propulsion device which makes possible the utilization of a fuel source which supplies a constant or near constant source of heat. Secondary heat using means are provided to divert the power from the main propulsive device which may be any external power user or a device which has a prime purpose of heat disposal.

Another object is to provide a system wherein a radionuclide of relatively low gamma activity supplies a constant primary heat source.

It is another object of the present invention to provide a containment means for a nuclear fuel including means by which it may be easily handled through the provision of small containment tubes having heat transfer means thereon and containing the fuel, such tubes carried in a larger shielded container and having means by which they are individually removable.

It is another object of this invention to provide fuel containment devices which provide a reasonable measure of safety. The fuel containment tubes and the larger container within which they are carried are provided with pressure and temperature relief means. The relief means dump the hot radionuclides and the environmental gas into a waste container where they are mixed with a liquid heat sink material and a chelating or chemical agent to reduce the temperature and radioactive hazard of the fuel.

It is another object of this invention to provide a radionuclide propulsion means which is adapted for use on any vehicle. The invention as used in an aircraft includes a small heat disposal engine mounted near the main propulsive engine. The invention as used in a water vehicle uses a heat exchanger immersed in water for heat disposal when the main propulsive engine is not used. A land vehicle uses a heat exchanger or means to channel the heat from the radionuclide heat source to external power using devices.

It is another object of the present invention to provide a radionuclide propulsive device having a heat disposal engine which may be altered to provide an auxiliary power source in case of failure of the main propulsive engine. The secondary or auxiliary engine which is normally used for heat disposal has means provided so that thrust may be developed and directed to provide motive power for emergency propulsion for reaching a repair location.

It is another object to provide a radionuclide propulsive device which may be used in combination with more conventional fuels for added power. The conventional fuel may optionally be injected into the device adjacent a heat exchanger from the radionuclide power source.

Further objects and advantages of the invention will become apparent from a reading of the following specification with the aid of the appended drawings wherein like numerals indicate like elements.

Figure 1:
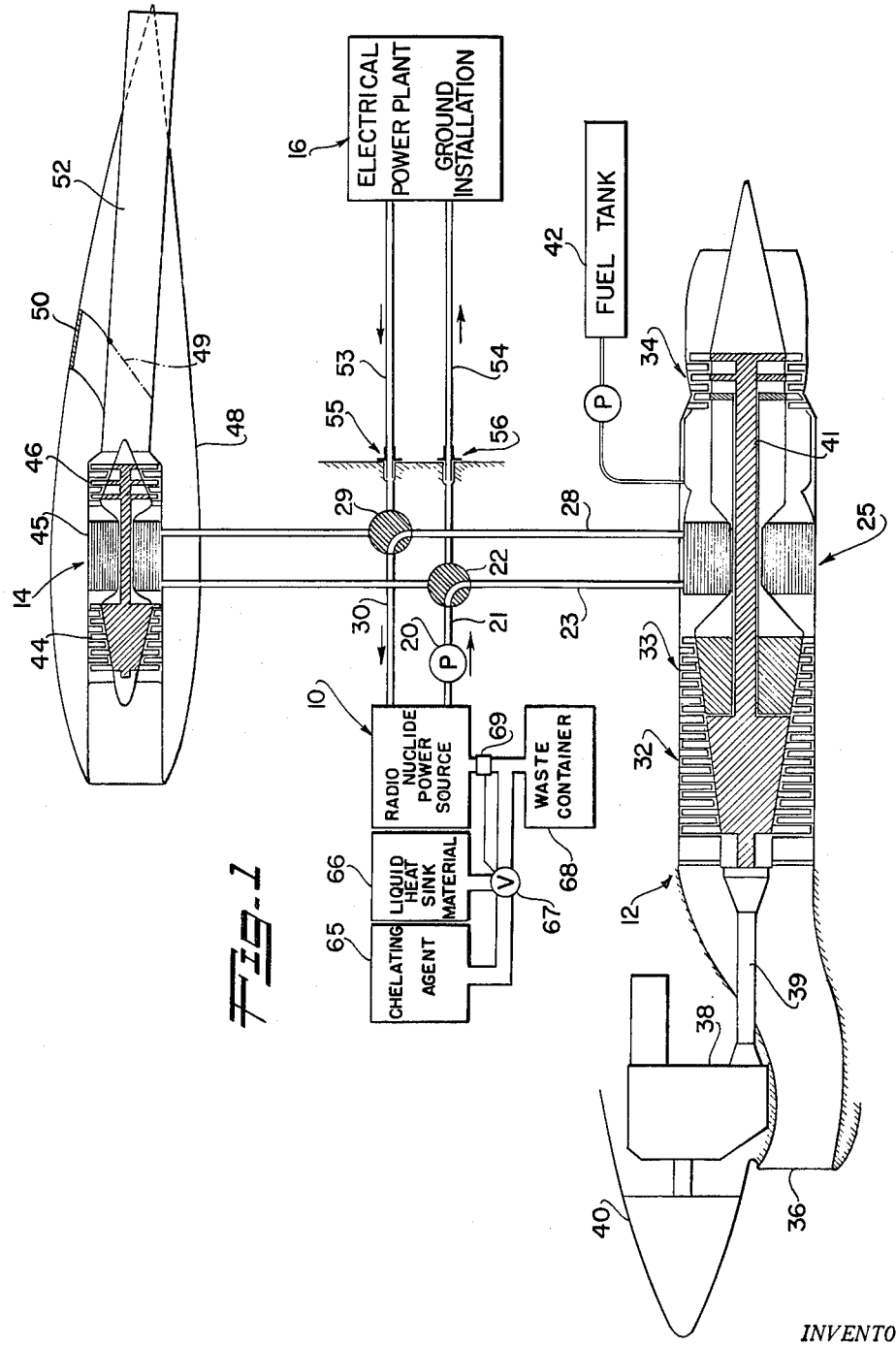
FIGURE 1 shows the propulsive device which is here a turbo-propeller engine with a radionuclide power source, a heat disposal device, and safety devices.

The combination of elements comprising the invention is shown in FIGURE 1. A liquid coolant is circulated through radionuclide container 10 where it picks up the heat and is pumped to the prime propulsive device 12, or to the heat disposal engine 14 when it is not desired to use the device 12. In some instances where the vehicle will be parked in a stationary position for an appreciable period of time, it is advisable to utilize the radionuclide power source in an external heat using device such as an electrical power plant ground installation 16.

For purposes of explanation, the propulsive device 12 is shown as a turbo-prop engine as would be used on an aircraft. The coolant from the radionuclide container 10 is forced by pump 20 through the conduit 21, three-way valve 22, and conduit 23 to the heat exchanger 25 in the engine 12. The coolant gives up its heat at exchanger 25 and is conducted back through the conduit 28 to three-way valve 29 and conduit 30 to the container 10. The engine 12 is shown in its normal configuration including a low pressure compressor 32, a high pressure compressor 33, a high and low pressure turbine 34 which drives the compressors when the air from inlet 36 is heated by exchanger 25. The propeller 40A (FIGURE 2) attached to spinner 40 is driven through gear box 38 and shaft 39 which is fixed to shaft 41. In instances where additional power is required for take-off, climb and in the case of an emergency, chemical or other more conventional fuels from tank 42 may be burned in the area between the heat exchanger 25 and the turbine 34.

As has been mentioned, a usual disadvantage of radionuclide fuels is that they continuously emit heat. The heat generation rate cannot be decreased as in the case of a reactor where the uranium process may be controlled in the reactor to stop its power output. When it is desired to stop the aircraft or any vehicle in which this particular type of propulsion device is used, it is necessary to conduct the coolant to a location other than the heat exchanger in the main propulsive engine since permitting the heat to remain in the radionuclide container 10 would probably result in its eventual destruction. The heat may be conducted to either a heat disposal device aboard the vehicle or to a ground installation which is in the form, for example, of an electrical power plant or other means which would effectively use heat for a bi-product purpose. The three-way valves 22 and 29 provide means to conduct the heated coolant to either heat disposal engine 14 or the ground installation or external heat utilization means 16. Heat disposal engine 14 is shown as a small turbine engine including a compressor 44, heat exchanger 45, and a turbine 46.

The heat disposal engine 14 is shown as mounted in the wing of the aircraft and as such is well adapted for providing an auxiliary power source in case of failure of the main turbo-prop engine 12. Where it is desired to merely dispose of the heat, a valve 49 may be turned to its dotted line position to conduct the heat upwardly through the silencer 50 which dissipates the energy from the turbine 46 and disperses the heat away from personnel on the ground. If propulsion device 12 fails for some reason, the valve 49 may be moved to its up position to duct the thrust from engine 14 to the conduit 52 in an aft direction through exhaust 52 so as to aid in propelling the aircraft. This small thrust by itself would not provide sufficient thrust to maintain flight, but on a craft having a plurality of engines, the additional thrust from one or two engines 14 may provide the margin of power necessary to return to base. Heat disposal engine 14 is shown mounted in the wing 48 but may be located elsewhere in the vehicle. The wing location exemplifies advantages of the radionuclide power source which will be discussed below.

When the aircraft is parked, the radionuclide power source may be used in a ground installation 16 by connecting conduits 53 and 54 to the outlets 55 and 56 in the aircraft structure. Proper positioning of three-way valves 22 and 29 causes the coolant to be conducted through the ground installation 16 where it may be utilized to generate electric power or for any other purposes for which heat may be used.

Figure 2:
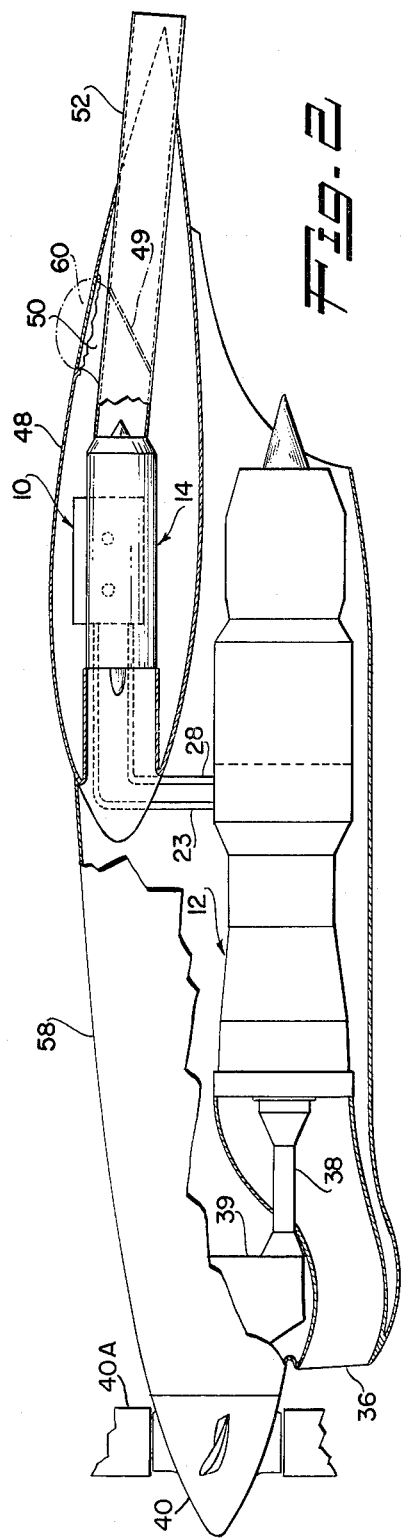
FIGURE 2 shows a side view of the radionuclide propulsive engine as used on an aircraft.
Figure 3:
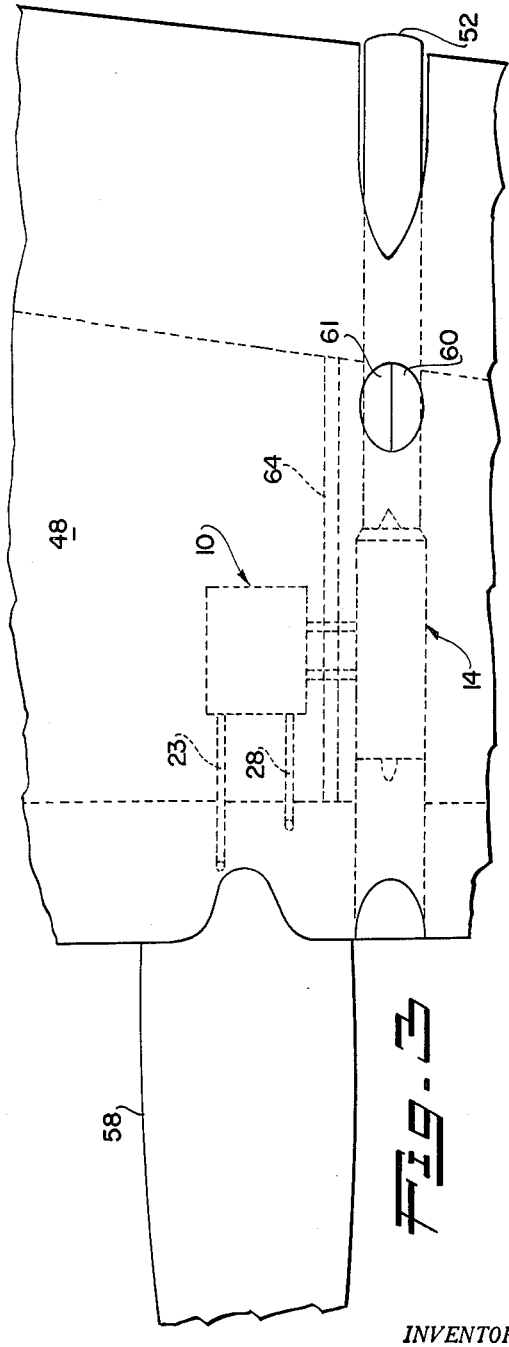
FIGURE 3 is a plan view of FIGURE 2 showing the orientation of the various elements of the propulsive means.

FIGURES 2 and 3 show more particularly the physical relationship of the radionuclide power container 10, the main propulsion device 12, and the heat disposal device 14. It will be remembered that the usual atomic reactor must be located at a remote place in the aircraft such as in an extended tail or an extended nose. This is primarily because of the danger of radioactivity to personnel and to structure of the aircraft around the reactor. Since the radionuclide has a relatively low gamma activity, it does not require the extremely thick shielding necessary with the atomic reactor and may be contained in a smaller package near each propulsion device. This minimizes the problem of heat insulation around the container 10 and the coolant conduits. The conduits to the propulsive device 12 and engine 14 therefore may be relatively short, further aiding the problem.

In contradistinction to normally known atomic heat sources, minimum protection is required in the vehicle using radionuclide fuel. In prior art systems, were an accident to take place there would be considerable danger that radio-activity would be spread throughout the community or the region of the accident. Since, in accidents wherein the crash of a standard aircraft is involved, the nacelles 58 of the aircraft are many times carried away, leaving the wing 48 intact, a simple barrier structure 64 in the wing of the present system provides a strong member to which both the container 10 and heat disposal engine 14 may be tied, thereby providing adequate protection for persons on the ground where a crash of an aircraft utilizing an engine of the sort is involved. This area of the wing around structure 64 usually remains intact after the other parts of the craft are destroyed protecting container 10 and engine 14. Thus, engine 14 will continue to operate to dispose of heat from container 10 so that there will be small chance that container 10 will fail, dispersing dangerous substances.

Should an emergency situation develop during flight or movement of the vehicle, additional safety means are provided and are shown in FIGURE 1. This safety system is used to dispose of the radionuclides. Ordinarily the radionuclide heat will be dissipated by the primary engine or the heat disposal engine 14. In event of a simultaneous or consecutive failure of these two engines, the radionuclide will be removed from its container 10 and dumped. It is obvious that the radionuclide cannot be safely disposed of into the surrounding air or water. It still retains some radioactivity and a great amount of heat. Some means must be provided by which the radioactivity may be counteracted and the heat dissipated. Container 65 holds a chelating or chemical agent and container 66 holds a liquid heat sink material. The chelating agent is a material which will reduce the biological toxicity of the radioactivity of the radionuclide. Examples of chelating agents include tetrasodium salt of ethylendiaminetetraacetic acid known as EDTA and 2,3-dimercapto-1-propanal known as BAL and sodium citrate. When this cannot be used, a chemical agent, such as an oxidizer may be chemically combined with the radioactive atoms in order to reduce the biological toxicity. The liquid heat sink material is a cooling material to reduce the enormous temperature of the radionuclide. The chelating or chemical agent and the heat sink material are released when temperature relief plug 69 melts away to actuate valve 67 to drop the chelating agent and the heat sink material along with the radionuclides into waste container 68. After being mixed in the waste container 68, the whole mixture may be dumped to the external medium or retained in waste container 68 until the craft returns to base.

Figures 4, 5:
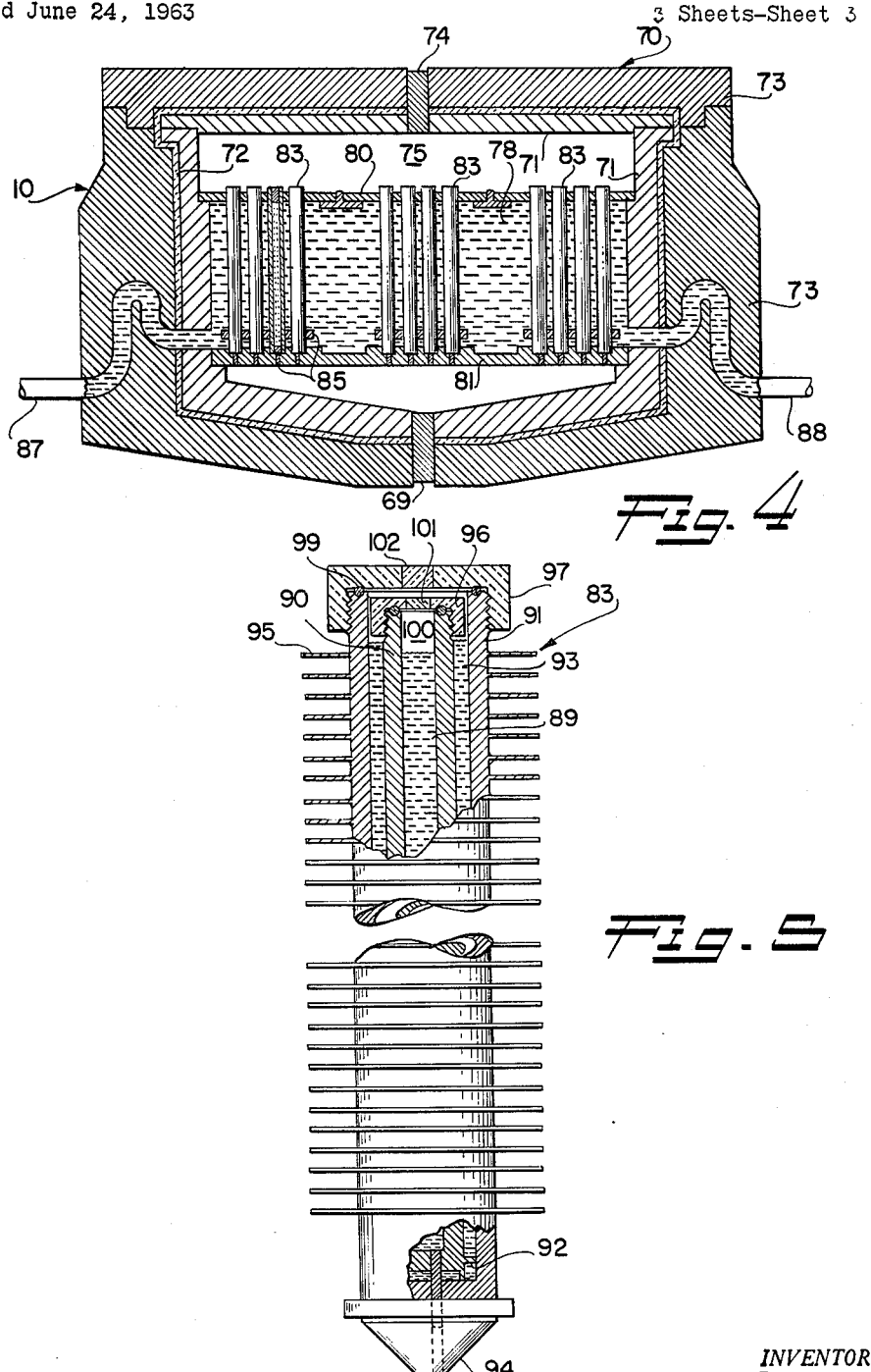
FIGURE 4 is a sectional view taken through a typical radionuclide fuel container.
FIGURE 5 is a view with parts broken away of the individual radionuclide containing tubes which go into the container of FIGURE 4.

The container 10 as shown in FIGURE 4 has a cover 70 which may be removed for replacing the radionuclides. Container 10 includes a strong inner container 71 around which there is an insulating material 72 and nuclear shielding 73. The inner container 71 is comprised of stainless steel or other material which can withstand the extreme heat generated, yet retain structural strength for rigidity. The cover 70 includes a pressure relief means 74 in case the gas in the area 75 builds to a dangerous pressure by reason of heating or otherwise above that which can be safely contained by container 71. A temperature relief plug 69 in the bottom of the container 10 is provided so that if the radionuclide temperature should rise to a dangerous level by reason of a failure of the circulation of the coolant 78 or for any other reason, the plug 69 will melt and the coolant 78 will be conducted out of the container 10 to the waste container 68 as previously described. To provide for an inverted crash situation, a temperature plug 69 may be placed in cover 70 and a pressure relief plug 74 in the bottom of container 10. Plates 80 and 81 confine the coolant 78 within the container 71 and also provide support for the radionuclide containment tubes 83. Both plates 80 and 81 are provided with apertures through which the containment tubes 83 may be inserted and held in place. The bottom plate 81 is provided with temperature relief plugs 85 comprised of material similar to the material in relief plug 69.

The containment tube 83 is shown in FIGURE 5. The radionuclide 89 is contained in inner tube 90 spaced by a spacer 92 inside outer tube 91 with coolant 93 therebetween to aid in conduction of heat from the radionuclide 89 to the exterior container 91. The outer container 91 is equipped with fins 95 to aid in the transfer of heat to the coolant 78 in which they will be immersed. The bottom of the containment tube 91 is cone-shaped at 94 to aid in the insertion through plate 80 and into plate 81 in the inner container 71. Both the inner tube 90 and the outer tube 91 are equipped with caps 96 and 97 which seat against O-rings 99 to contain the radionuclide 89 and the coolant 93. The overhang of the exterior cap 97 provides means by which tongs or other removal means may grasp the tube to lift it from the upper plate 80 and the lower plate 81 in the large container 10. The space 100 between the radionuclide 89 and the cap 96 of inner container 90 is filled with an inert gas such as argon or helium to prevent oxidation of the radionuclide 89. Cap 96 is provided with a relief plug 101 which will permit the environmental gas to seep through in case the pressure in space 100 reaches a dangerous level. Cap 97 is equipped with the relief plug 102. Relief plugs 74, 101, and 102 are constructed of quartz or glass which are sufficiently porous to permit release of high pressures without destruction of the plug. Thus when sufficient pressure is bled off, there will be no further escape of the gas so that operation of the device may continue uninterrupted.

The invention has been shown described as used on an aircraft. It will be understood that it may be used on other vehicles such as ships, other surface vehicles, undersurface vehicles or space vehicles. Each would include a prime propulsive device, a secondary propulsive or heat disposal device, and a radionuclide container. Safety features such as those described and the alternative of an external connection for external power are also usually provided. For example, on a water vehicle, whether surfaces or submersible, the main propulsive device could be a turbine engine as shown, or the heat exchanger could generate steam directly which would then drive a turbine to drive a propeller in the water or an engine similar to a ram-jet wherein cold sea water could be ducted through the inlet at the forward end of a tubular member, heated to steam, and ducted through the aft end to provide thrust. The heat disposal device could be a heat exchanger immersed in water. A space vehicle would carry an inert gas supply which would be heated by the heat exchanger thereby expanded and caused to propel the vehicle.

Additionally, it will be undestood that portions of the system are capable of ready utilization for the generation of heat for purposes other than of a propulsive nature. For example, the radionuclide power source 10 may be utilized with either or both the heat exchangers 25 and 45 to provide heat for acceptance by conventional electrical generation apparatus or for heating of a space vehicle. The safety features of the chelating agent from container 65, the heat sink material from container 66 and the waste container 68 may also be utilized with such system portions.

As mentioned before, the basic propulsion device utilizing a radionuclide power source such as polonium 210 or curium 242 has the capability of extremely long range operation. Radionuclides of interest have half-lives as long as 50 days to 35 years. This means that the hot source will decay to one half its power during this period. Other advantages accrue because of the resultant powerplant's light weight and small volume. The radionuclide also has a very low gamma intensity radiation field activity which results in a relatively safe vehicle.

Having described the details of our device, we claim the following combination of elements and their equivalents as our invention.

We claim:

1. A propulsion system comprising a radionuclide heat source which consists of a neutron bombarded substance which has a relatively low gamma activity and continuously emits a high thermal heat, a first engine, a heat exchanger in the engine, conduit means from the heat source to the heat exchanger, pump means in said conduit means for transferring heat from the heat source to the first engine, liquid coolant in the conduit means, a heat dissipation device including a second engine separate from said first engine, and valve means in the conduit means to direct the heat to the heat dissipation device, a waste container connected to said radionuclide heat source and a heat sink material associated with said waste container for cooperatively controlling the heat and toxicity of said substance, said first engine also having a chemical fuel burning chamber to which a fuel line is connected, said first engine being operable on either conventional chemical fuel or on the energy from the radionuclide source.

2. A propulsion system comprising a radionuclide heat source, said source consisting of a neutron bombarded substance which has a relatively low gamma activity and continuously emits a high thermal heat, a first engine adapted to exert propulsive force when heat is applied internally thereto, a heat exchanger in the first engine, conduit means from the radionuclide heat source to a first three-way valve, a second three-way valve, conduit means from a second three-way valve to the radionuclide heat source, liquid coolant means in the conduit means to transfer heat from the radionuclide heat source to the heat exchanger and back to the radionuclide heat source through the three-way valves, a heat dissipation device, in the form of a second engine separate from said first engine, conduit means from the first and second three-way valves to the heat dissipation device, and means to turn the valves so that the liquid coolant flows from the heat source through the conduit means to the heat dissipation device means, a waste container connected to said radionuclide heat source and a heat sink material associated with said waste container for cooperatively controlling the heat and toxicity of said substance, said first engine also having a chemical fuel burning chamber to which a fuel line is connected, said first engine being operable on either conventional chemical fuel or on the energy from the radionuclide source.

3. Propulsion means comprised of a radionuclide heat source, said source consisting of a neutron bombarded substance which has a relatively low gamma activity and continuously emits a high thermal heat, an engine including a compressor and a turbine, a first heat exchanger between the compressor and the turbine, conduit means from the radionuclide heat source and having a three-way valve system, conduit means from a three-way valve system to the heat exchanger in the turbine engine, liquid coolant in the conduit means, heat disposal means remote from said engine and including a second heat exchanger, conduit means from the three-way valve means to the second heat exchanger, the heat disposal means adapted to provide a thrust, means to direct the thrust upwardly so as to dissipate heat without providing forward thrust, means to direct the thrust aft, conduit means leading from the three-way valve system and connected to an external heat utilization means, and means to turn the three-way valve system so that radionuclide heat is selectively supplied by means of the liquid coolant in the conduit means to the engine, to the heat disposal means, a waste container connected to said radionuclide heat source and a heat sink material associated with waste container for cooperatively controlling the heat and toxicity of said substance, and to the external heat utilization means, said engine also having a chemical fuel burning chamber to which a fuel line is connected, said engine being operable on either conventional chemical fuel or on the energy from the radionuclide source.

4. A radionuclide propulsion system comprising a source of radionuclide material, said material consisting of a neutron bombarded substance which has a relatively low gamma activity and continuously emits a high thermal heat, a first turbine type propulsive device including a heat exchanger selectively connectable to said source in a heat exchange relation, a second turbine type propulsive device separate from said first device selectively connectable to said source in heat exchange relation, means in at least one of said propulsive devices for conducting heat therefrom in a generally non-rearward direction, and means to selectively connect said source to a separate, remote heat dissipation device, a waste container connected to said source and a heat sink material associated with said waste container for cooperatively controlling the heat and the toxicity of said radionuclide material, said first propulsion device also having a chemical fuel burning chamber to which a fuel line is connected, said engine being operable on either conventional chemical fuel or on the energy from the radionuclide source.

5. Propulsion means comprising a radionuclide heat source container, an engine adapted to exert propulsive force when heat is applied internally thereto, a heat exchanger in the engine, conduit means from the radionuclide heat source container to the heat exchanger in the engine, liquid coolant means in the conduit means to transfer heat from the radionuclide heat source container to the heat exchanger, a waste container, conduit means between the radionuclide heat source container and the waste container, a melt-out plug in the conduit means between the heat container and the waste container which will melt to dump hot radionuclides into the waste container, a liquid heat sink material container, a chelating agent container, conduit means from the liquid heat sink material container and the chelating agent containing to the waste container, and valve means in the last named conduit means, and means responsive to the melting of the melt-out plug to open the valve means so that the hot radionuclide is mixed with the liquid heat sink material flowing and the chelating agent in the waste container.

6. A propulsion system comprising a radionuclide heat source container including nuclear shielding about the exterior surfaces, a melt-out plug in the base of the container extending from its interior through the nuclear shielding to the exterior, a plurality of radionuclide containment vials in the container in spaced relationship, an engine adapted to exert propulsive force when heat is applied internally thereto, a heat exchanger in the engine, conduit means from the radionuclide heat source container to the heat exchanger in the engine, and liquid coolant means in the conduit means and the radionuclide heat source container so as to transfer heat from the container to the heat exchanger.

7. A radionuclide propulsion system comprising a radionuclide source in a container, a turbine type propulsive device including a heat exchanger selectively conectable to said source in a heat exchange relation, a heat dissipation device separate from said propulsion device and having a heat exchanger selectively connectable to said source in heat exchange relation, a waste container disposed adjacent the radionuclide container, means to release the radionuclide material so that it automatically enters the waste material container, sources of heat sink material and chelating agent connected to said waste container, and means for releasing said heat sink material and chelating agent so that they are released for mixing with the radionuclide material in the waste container to reduce the heat and the toxicity of the radionuclide material.

8. A heat generating system comprising:
a radionuclide heat source,
a waste container coupled to the radionuclide heat source,
a heat sensitive seal disposed between the heat source and the waste container serving to prevent a runaway condition in the heat source by opening when the heat source reaches a predetermined upper temperature limit,
a source of liquid heat sink material coupled to the waste container for cooling the radionuclide heat source,
a source of chelating material coupled to the waste container for reducing biological toxicity of the radionuclide heat source,
a valve means disposed between the chelating materials source and liquid heat sink source, and
a means for opening the valve means coupled to the heat sensitive seal and being responsive to the opening of the seal.

(Other references on following page)

References Cited by the Examiner
UNITED STATES PATENTS

| | | | |
|---|---|---|---|
| 2,765,414 | 10/1956 | Gendler et al. | 176—57 X |
| 2,830,190 | 4/1958 | Karp | 250—106 |
| 2,866,905 | 12/1958 | Yeomans | 250—106 |
| 2,970,436 | 2/1961 | Sims | 60—39.28 |
| 2,974,495 | 3/1961 | Pinnes et al. | 60—59 |
| 3,084,508 | 4/1963 | Olbrich | 60—35.54 |
| 3,113,428 | 12/1963 | Colley et al. | 60—35.54 |

OTHER REFERENCES

R. W. Bussard et al.: Nuclear Rocket Propulsion, McGraw-Hill Book Co., May 1958, page 317. May 1959, Nucleonics, pp. 166, 167, 168, 171, 172, 173. August 1960, Nucleonics, pp. 58–63.

REUBEN EPSTEIN, *Primary Examiner.*

CARL D. QUARFORTH, *Assistant Examiner.*